United States Patent [19]
Okada et al.
[11] Patent Number: 4,774,136
[45] Date of Patent: Sep. 27, 1988

[54] SOLVENT FOR THE CHROMOGENIC DYE-PRECURSOR MATERIAL FOR A PRESSURE-SENSITIVE RECORDING PAPER SHEET AND A PRESSURE-SENSITIVE RECORDING PAPER SHEET PREPARED BY USING THE SOLVENT

[75] Inventors: Yoshio Okada, Matsudo; Tadashi Nakamura; Youichi Ohhira, both of Iwaki, all of Japan

[73] Assignee: Kureha Kagaku Kogyo Kabushiki Kaisha, Tokyo, Japan

[21] Appl. No.: 75,991

[22] Filed: Jul. 21, 1987

Related U.S. Application Data

[62] Division of Ser. No. 914,986, Oct. 3, 1986, Pat. No. 4,699,659.

[30] Foreign Application Priority Data

May 2, 1986 [JP] Japan ................................ 61-10227

[51] Int. Cl.⁴ ........................ B32B 9/16; B41M 5/16; B41M 5/22

[52] U.S. Cl. ................................ 428/402.2; 427/150; 428/402.21; 503/213; 503/215

[58] Field of Search .................. 106/21; 427/150-152; 503/213, 215, 225; 428/402.2, 402.21, 402.22, 913, 914

[56] References Cited

U.S. PATENT DOCUMENTS

| | | | |
|---|---|---|---|
| 3,627,581 | 12/1971 | Phillips, Jr. | 503/213 |
| 3,979,324 | 9/1976 | Herber | 8/500 |
| 4,054,937 | 10/1977 | Mandelcorn et al. | 361/319 |
| 4,440,846 | 4/1984 | Sanders et al. | 430/138 |

FOREIGN PATENT DOCUMENTS

| | | | |
|---|---|---|---|
| 47-1869 | 1/1972 | Japan . | |
| 50-14570 | 5/1975 | Japan | 503/213 |
| 49-80045 | 8/1975 | Japan . | |
| 56-156222 | 12/1981 | Japan | 503/213 |
| 1285259 | 8/1972 | United Kingdom | 503/213 |
| 1350893 | 4/1974 | United Kingdom | 503/213 |
| 1352597 | 5/1974 | United Kingdom | 503/213 |
| 1352597 | 5/1974 | United Kingdom | 503/213 |
| 1045456 | 9/1975 | United Kingdom | 503/213 |
| 1526353 | 9/1978 | United Kingdom | 503/213 |
| 1352597 | 5/1974 | United Kingdom | 503/213 |
| 1352597 | 5/1974 | United Kingdom | 503/213 |

OTHER PUBLICATIONS

"Alkalation of Biphenyl Under Mild Friedel-Crafts Conditions", by D. B. Priddy, *IEC., Product Research and Development,* vol. 8, No. 3, 239-241 (1969).

*Primary Examiner*—Bruce H. Hess
*Attorney, Agent, or Firm*—Nixon & Vanderhye

[57] ABSTRACT

Disclosed herein are a solvent for a chromogenic dye-precursor material for a pressure-sensitive recording paper sheet, comprising (1) 30 to 80% by weight of p-monoisopropylbiphenyl or a biphenyl mixture of not less than 80% by weight of p-monoisopropylbiphenyl, not more than 20% by weight of m-monoisopropylbiphenyl and not more than 10% by weight of diisopropylbiphenyl, and (2) 70 to 20% by weight of diisopropylnaphthalene or a naphthalene mixture of not less than 97% by weight of diisopropylnaphthalene, not more than 1% by weight of monoisopropylnaphthalene and not more than 2% by weight of triisopropylnaphthalene, and a pressure-sensitive recording paper sheet prepared by using the solvent.

2 Claims, No Drawings

SOLVENT FOR THE CHROMOGENIC DYE-PRECURSOR MATERIAL FOR A PRESSURE-SENSITIVE RECORDING PAPER SHEET AND A PRESSURE-SENSITIVE RECORDING PAPER SHEET PREPARED BY USING THE SOLVENT

CROSS-REFERENCE TO RELATED APPLICATIONS

This application is a divisional of earlier application Ser. No. 914,986 filed Oct. 3, 1986, now U.S. Pat. No. 4,699,659 issued Oct. 13, 1987.

BACKGROUND OF THE INVENTION

The present invention relates to a solvent for the chromogenic dye-precursor material for a pressure-sensitive recording paper sheet and a pressure-sensitive recording paper sheet prepared by using the solvent, and more in detail relates to a solvent of the chromogenic dye-precursor material for the pressure-sensitive recording paper sheet, which comprises (1) 30 to 80% by weight of p-monoisopropylbiphenyl or a biphenyl mixture of not less than 80% by weight of p-monoisopropylbiphenyl, not more than 20% by weight of m-monoisopropylbiphenyl and not more than 10% by weight of diisopropylbiphenyl, and (2) 70 to 20% by weight of diisopropylnaphthalene or a naphthalene mixture of not less than 97% by weight of diisopropylnaphthalene, not more than 1% by weight of monoisopropylnaphthadene and not more than 2% by weight of triisopropylnaphthalene, and the pressure-sensitive recording paper sheet prepared by using the above-mentioned solvent as a solvent for the chromogenic dye-precursor material.

A pressure-sensitive recording paper sheet comprises a colour-development sheet prepared by coating microcapsules in which a solution of a colourless electron donating chromogenic dye-precursor material having a colouring reactivity has been encapsuled, onto a supporting sheet and a colour-developer sheet prepared by coating a colour-developer which develops a colour on contacting to the chromogenic dye-precursor material onto a supporting sheet.

In recent years, the pressure-sensitive recording paper sheets have been broadly used instead of carbon copying paper sheets and back-carbon copying paper sheets of pigment type.

As the pressure-sensitive recording paper sheets, it is necessary that they are excellent in colour-development, stability for long term preservation and light resistance and that they are low in toxicity not to cause environmental pollution.

As the solvent which dissolves the chromogenic dye-precursor material for the pressure-sensitive recording paper sheet, it is demanded that the solvent fulfills the following requirements.

(1) To dissolve the chromogenic dye-precursor material to a high concentration.

(2) Not to cause the decomposition and colour-development of the chromogenic dye-precursor material.

(3) To show a considerably high boiling point, and not to evaporate in the thermal drying step and under high atmospheric temperature.

(4) Not to reduce to water on encapsulating.

(5) To show a high speed of colour-development and a high concentration of the developed colour as well as the high colour stability after colour-developing.

(6) To be stable to light, heat and chemicals.

(7) To show a low viscosity so that its flow out from the broken capsules is freely carried out.

(8) To be substantially odorless.

(9) To show a low toxicity to human body and to be safe.

(10) To show a favorable biodegradability and not to cause environmental pollution.

As the solvent of the chromogenic dye-precursor material for the pressure-sensitive recording paper sheet, which fulfills the above-mentioned requirements, several solvents have been proposed. For instance, (1) a mixed solvent comprising more than 30% by weight of isopropylbiphenyl (represented by the formula:

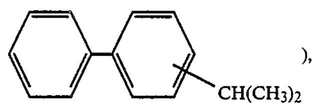
), less than 55% by weight of polyisopropylbiphenyl and less than 15% by weight of biphenyl, which is used for preparing a solution of the chromogenic dye-precursor material to be contained in the capsules used for coating onto a sheet material for pressure-sensitive recording paper sheets (U.S. Pat. No. 3,627,581), (2) a solvent for the chromogenic dye-precursor material, comprising at least one of $C_{1-12}$-alkylated biphenyl or $C_{1-12}$-alkylated terphenyl, or a mixture of the alkylated-biphenyl or -terphenyl and other solvent [wherein the number of the alkyl group in the alkylated biphenyl is 1 to 4, that in the alkylated terphenyl is 1 to 6 and not less than two alkyls may be the same or different from each other] (British Patent No. 1352597) and (3) a solvent of the chromogenic dye-precursor material for the pressure-sensitive recording pape sheet, comprising a combination of 10 to 100 parts by weight, preferably 30 to 70 parts by weight of monoisopropylbiphenyl with 100 parts by weight of diisopropylnaphthalene (Japanese Patent Publication No. 50-14570 (1975)).

With the propagation of the pressure-sensitive recording paper sheets, the case wherein the pressure-sensitive recording paper sheets are used in cold districts of not more than $-5°$ C. in the ambient temperature or transported and preserved for a long time in the environment of about 40° to 50° C. in the ambient temperature and of higher than about 80% in relative humidity has increased.

Particularly, in the outdoor facilities such as gasoline service stands, the pressure-sensitive recording paper sheets ar used under the environment of not more than $-5°$ C. in winter.

Since in such an environment of low atmospheric temperature, (1) the solvent of the-chromogenic dye-precursor material used in the pressure-sensitive recording paper sheet crystallizes, (2) it is necessary for a very long time in order to clearly develop or (3) the colour-developed image is very light in colour, if developed, not to be deciphered, such a pressure-sensitive recording paper sheet is not to be put to practical use. Namely, it is demanded that an initial colour developing activity within 30 sec from the recording is at least 40%.

"Isopropylbiphenyl" disclosed in the Japanese Patent Publication No. 50-14570 (1975) and U.S. Pat. No.

3,627,581 as the solvent of the chromogenic dye-precursor material for the pressure-sensitive recording paper sheet is a mixture of isomers represented by the formula:

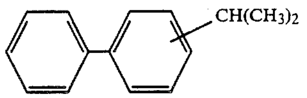

wherein the isopropyl group occupies the o-, m- or p-position of the benzene ring of biphenyl.

The commercialized "isopropylbiphenyl" and the isopropyliphenyl synthesized by Friedel-Crafts alkylation of biphenyl (refer to Industrial and Engineering Chemistry Product Research and Development, Vol. 8, 239–241, 1969) is a mixture of m-isomer and p-isomer containing a small amount of o-isomer. Such a mixed solvent exhales an offensive odor strongly and is not to be used as the solvent for the chromogenic dye-precursor material for the pressure-sensitive recording paper sheet (refer to Japanese Patent Publication No. 50-14570 (1975)).

The problem of offensive odor occurs in the process for preparing the pressure-sensitive recording paper sheet when the recording paper sheet material prepared by coating the microcapsules containing the solution of the chromogenic dye-precursor onto the supporting sheet is cut after drying. Namely, when the pressure-sensitive recording paper sheet is cut at a relatively high temperature of 40° to 50° C., the solvent flowing out from the thus broken microcapsules gives a disagreeable impression to the operators. In addition, on the cases when the solvent adheres to clothes or hands in the cutting step of the pressure-sensitive recording paper sheet or in the handling of the solvent, the odor still remains even after washing the clothes or the hands with a cleanser to give a disagreeable impression. Furthermore, the pressure-sensitive recording paper sheets which have been subjected to recording are assembled and preserved in a storehouse for a relatively long time. In such occasion, the odor emitted from a large amount of the pressure-sensitive recording paper sheets which have been subjected to recording becomes to be the cause of disagreeable impression.

As has been shown above, the problem of the disagreeable odor concerning the pressure-sensitive recording paper sheets has been conspicuous in recent years.

As a result of the present inventors' studies for obtaining a solvent for the chromogenic dye-precursor material for the pressure-sensitive recording paper sheets, which is almost odorless, shows an excellent colour-development even at a low temperature of −5° C., and does not crystallize at such a low temperature of −5° C., it has been found that a solvent prepared by admixing diisopropylnaphthalene with p-monoisopropylbiphenyl at a specified ratio is almost odorless, does not crystallize at a low temperature of −5° C. and fulfills all the above-mentioned requirements which are to be possessed by the solvent of the chromogenic dye-precursor material for the pressure-sensitive recording paper sheet, and based on the findings, the present inventors have attained the present invention.

SUMMARY OF THE INVENTION

In a first aspect of the present invention, provided there is a substantially odorless solvent for a chromogenic dye-precursor material for a pressure-sensitive recording paper sheet, consisting essentially of (1) 30 to 80% by weight of p-monoisopropylbiphenyl or a biphenyl mixture of not less than 80% by weight of p-monoisopropylbiphenyl, not more than 20% by weigh of m-monoisopropylbiphenyl and not more than 10% by weight of diisopropylbiphenyl, the biphenyl mixture being substantially completely devoid of o-monoisopropylbiphenyl, and (2) 70 to 20% by weight of diisopropylnaphthalene or a naphthalene mixture of not less than 97% by weight of diisopropylnaphthalene, not more than 1% by weight of monoisopropylnaphthalene and not more than 2% by weight of triisopropylnaphthalene.

In a second aspect of the present invention, there is provided microcapsules for a pressure-sensitive recording paper sheet, comprising hydrophilic colloid walls containing a dye composition which is composed of a chromogenic dye-precursor material and a substantially odorless solvent for a chromogenic dye-precursor material for a pressure-sensitive recording paper sheet, consisting essentially of (1) 30 to 80% by weight of p-monoisopropylbiphenyl or a biphenyl mixture of not less than 80% by weight of p-monoisopropylbiphenyl, not more than 20% by weight of m-monoisopropylbiphenyl and not more than 10% by weight of diisopropylbiphenyl, the biphenyl mixture being substantially completely devoid of o-monoisopropylbiphenyl, and (2) 70 to 20% by weight of diisopropylnaphthalene or a naphthalene mixture of not less than 97% by weight of diisopropylnaphthalene, not more than 1% by weight of monoisopropylnaphthalene and not more than 2% by weight of triisopropylnaphthalene.

In a third aspect of the present invention, there is provided a pressure-sensitive recording paper sheet coated with microcapsules containing a dye composition which is composed of a chromogenic dye-precursor material and a substantially odorless solvent for a chromogenic dye-precursor material for a pressure-sensitive recording paper sheet, consisting essentially of (1) 30 to 80% by weight of p-monoisopropylbiphenyl or a biphenyl mixture of not less than 80% by weight of p-monoisopropylbiphenyl, not more than 20% by weight of m-monoisopropylbiphenyl and not more than 10% by weight of diisopropylbiphenyl, the biphenyl mixture being substantially completely devoid of o-monoisopropylbiphenyl, and (2) 70 to 20% by weight of diisopropylnaphthalene or a naphthalene mixture of not less than 97% by weight of diisopropylnaphthalene, not more than 1% by weight of monoisopropylnaphthalene and not more than 2% by weight of triisopropylnaphthalene.

In a fourth aspect of the present invention, there is provided a process for producing a p-monoisopropylbiphenyl solvent mixture of not less than 80% by weight of p-monoisopropylbiphenyl, not more than 20% by weight of m-monoisopropylbiphenyl and not more than 10% by weight of diisopropylbiphenyl, the solvent mixture being substantially completely devoid of o-monoisopropylbiphenyl, comprising (1) reacting biphenyl with propylene at a temperature of 200° to 300° C. for 1 to 10 hours in the presence of a silica-alumina catalyst or a zeolite catalyst, or (2) reacting biphenyl with mixture at a temperature of 70° to 120° C. for 1 to 8 hours in the presence of an aluminium chloride catalyst, and subjecting the obtained reaction mixture to rectification treatment.

In a fifth aspect of the present invention, there is provided a process for producing a diisopropylnaphthalene solvent mixture of not less than 97% by weight of diisopropylnaphthalene, not more than 1% by weight of monoisopropylnaphthalene and not more than 2% by weight of triisopropylnaphthalene, comprising reacting naphthalene with propylene at a temperature of 200° to 280° C. for 1 to 5 hours in the presence of a silica-alumina catalyst or a zeolite catalyst, and subjecting the obtained reaction mixture to rectification treatment.

DETAILED DESCRIPTION OF THE INVENTION

The substantially odorless solvent for the chromogenic dye-precursor material for the pressure-sensitive recording paper sheet according to the present invention (hereinafter referred to as the present solvent) consisting essentially of (1) 30 to 80% by weight of p-monoisopropylbiphenyl or a biphenyl mixture of not less than 80% by weight of p-monoisopropylbiphenyl, not more than 20% by weight of m-monoisopropylbiphenyl and not more than 10% by weight of diisopropylbiphenyl (hereinafter referred to as "p-monoisopropylbiphenyl" according to the present invention), the biphenyl mixture being substantially completely devoid of o-monoisopropylbiphenyl, and (2) 70 to 20% by weight of diisopropylnaphthalene or a naphthalene mixture of not less than 97% by weight of diisopropylnaphthalene, not more than 1% by weight of monoisopropylnaphthalene and not more than 2% by weight of triisopropylnaphthalene (hereinafter referred to as "diisopropylnaphthalene" according to the present invention).

p-Monoisopropylbiphenyl contained in monoisopropylbiphenyl is almost odorless, excellent in dissolving the chromogenic dye-precursor material (determined at 20° C.) but the melting point thereof is 11° C. In order to prevent the crystallization of p-monoisopropylbiphenyl at low temperatures such as −5° C., a specified amount of diisopropylnaphthalene is added thereto, and the thus obtained mixture is used as the solvent of the chromogenic dye-precursor material for the pressure-sensitive recording paper sheet.

"p-Monoisopropylbiphenyl" according to the present invention may contain m-monoisopropylbiphenyl and diisopropylbiphenyl to the extent that they do not spoil the specificity of p-monoisopropylbiphenyl of almost odorless. Accordingly, a biphenyl mixture as "p-monoisopropylbiphenyl" according to the present invention is composed of not less than 80% by weight, preferably not less than 90% by weight of p-monoisopropylbiphenyl not more than 20% by weight, preferably not more than 10% by weight of m-monoisopropylbiphenyl and not more than 10% by weight preferably not more than 5% by weight of diisopropylbiphenyl, and does not contain o-monoisopropylbiphenyl.

"p-Monoisopropylbiphenyl" according to the present invention may be produced by the following processes.

(1) Biphenyl and propylene are reacted by heating to a temperature of 200° to 300° C., preferably 250° to 290° C. for 1 to 10 hours in the presence of silica-alumina catalyst. After the reaction is over, the catalyst is removed from the reaction mixture by filtration thereof, and the filtrate is subjected to rectification treatment, thereby obtaining "p-monoisopropylbiphenyl" according to the present invention, which contains not less than 80% by weight of p-monoisopropylbiphenyl.

(2) Biphenyl and propylene are reacted by heating to a temperature of 200° to 300° C., preferably 220° to 290° C. for 1 to 10 hours in the presence of zeolite catalyst. After the reaction is over, the catalyst is removed from the reaction mixture by filtration thereof, and the filtrate is subjected to rectification treatment, thereby obtaining "p-monoisopropylbiphenyl" according to the present invention, which contains not less than 80% by weight of p-monoisopropylbiphenyl.

(3) Biphenyl and propylene are reacted by heating to a temperature of 70° to 120° C., preferably 80° to 90° C. for 1 to 8 hours in the presence of aluminium chloride catalyst. After the reaction is over, the catalyst is removed from the reaction mixture, and the thus obtained organic layer is subjected to rectification treatment, thereby obtaining "p-monoisopropylbiphenyl" according to the present invention, which contains not less than 80% by weight of p-monoisopropylbiphenyl.

However, the production of "p-monoisopropylbiphenyl" according to the present invention is not limited to the abovementioned processes.

As has been described above, it is not necessary that "p-monoisopropylbiphenyl" according to the present invention is the single and pure compound of p-monoisopropylbiphenyl, however, any biphenyl mixture containing m-monoisopropylbiphenyl in an amount of over 20% by weight is not desirable because of the occurrence of problems of odor. In addition, it is necessary that o-monoisopropylbiphenyl is not contained in biphenyl mixtur of the present invention in view of odor and that the content of diisopropylbiphenyl is below 10% in view of the solubility of the chromogenic dye-precursor material.

"Diisopropylnaphthalene" according to the present invention as another component of the present solvent is compose of not less than 97% by weight, preferably not less than 98.5% by weight of diisopropylnaphthalene, not more than 1% by weight, preferably not more than 0.5% by weight of monoisopropylnaphthalene and not more than 2% by weight, preferably not more than 1% by weight of triisopropylnaphthalene.

"Diisopropylnaphthalene" according to the present invention may be produced by the following process.

Naphthalene and propylene are reacted by heating to a temperature of 200° to 280° C., preferably 210° to 250° C. for 1 to 5 hours in the presence of a silica-alumina catalyst or zeolite catalyst. After the reaction is over, the catalyst is removed from the reaction mixture by filtration, and the filtrate is subjected to rectification treatment to obtain "diisopropylnaphthalene" according to the present invention, which contains not less than 97% by weight of diisopropylnaphthalene.

However, the production of "diisopropylnaphthalene" according to the present invention is not limited by the abovementioned production processes.

The present solvent is a mixture of 30 to 80% by weight of "p-monoisopropylbiphenyl" according to the present invention and 70 to 20% by weight of "diisopropylnaphthalene" according to the present invention. In the case where "p-monoisopropylbiphenyl" according to the present invention is over 80% by weight crystals of p-monoisopropylbiphenyl precipitate from the solvent at low temperatures, for instance, −5° C. and accordingly, it is not desirable.

On the other hand, in the case where "p-monoisopropylbiphenyl" according to the present invention is under 30% by weight, the colour-developing activity at low temperatures, for instance, −5° C., namely, the initial colour-developing activity after 30 sec of recording does not attain the practical value and accordingly, it is not desirable.

The heart of the present invention is characterized in that a mixture of (1) 30 to 80% by weight of p-monoisopropylbiphenyl or a biphenyl mixture of not less than 80% by weight of p-monoisopropylbiphenyl, not more than 20% by weight of m-monoisopropylbiphenyl and not more than 10% by weight of diisopropylbiphenyl, and (2) 70 to 20% by weight of diisopropylnaphthalene or a naphthalene mixture of not less than 97% by weight of diisopropylnaphthalene, not more than 1% by weight of monoisopropylnaphthalene and not more than 2% by weight of triisopropylnaphthalene is used as a solvent for dissolving the chromogenic dye-precursor material. Accordingly, the present invention is not limited by the method of encapsulation, the kinds of the chromogenic dye-precursor material, the colour-developer, the method of preparing the slurry of the above-mentioned materials and the method of coating the slurry onto the paper sheet material, namely, all the methods known by the persons skilled in the art can be applied in the present invention.

For instance, as the method of encapsulation, the method utilizing coacervation disclosed in U.S. Pat. Nos. 2,800,457 and 2,800,458 and the method by interfacial polymerization disclosed in British patent No. 990,443 and U.S. Pat. No. 3,287,154 are utilizable.

As the chromogenic dye-precursor material, compounds of triphenylmethanes, diphenylmethanes, xanthenes, thiazines and spiropyranes may be exemplified.

Further, as the acidic substance used as the colour-developer, active clayish substances such as acidic clay, active clay, atapalgite, bentonite and zeolite, or organoacidic substances such as phenol resin, acidic reactive phenol-formalde hyde novolac resin and metal salts of aromatic organic acid may be exemplified.

The solvent for the chromogenic dye-precursor material for the pressure-sensitive recording paper sheet according to the present invention is almost odorless and excellent in dissolving the chromogenic dye-precursor material, does not crystallize at lower temperature of −5° C. and fulfills the necessary requirement which is to be provided by the above-mentioned solvent of the chromogenic dye-precursor for the pressure-sensitive recording paper sheet.

In addition, the initial colour-development after 30 sec of recording at a low temperature of −5° C. of the pressure-sensitive recording paper sheet according to the present invention is not lower than 40% and accordingly, the pressure-sensitive recording paper sheet according to the present invention can be applied to practical use even in cold districts.

The present invention will be concretely explained while referring to the non-limitative Examples, Comparative Examples and Reference Examples as follows.

EXAMPLE 1

Synthesis of p-monoisopropylbiphenyl mixture

Into a 20-liter stainless steel autoclave provided wit a heating apparatus, 12 kg of biphenyl and 1.5 kg of silica-alumina catalyst (made by NIKKI Chemical Co., Ltd., X-632 HN) we introduced, and oxygen in the autoclave was substituted by nitrogen gas Then the autoclave was heated to 70° C. (inner temperature), and the stirring was commenced. From the same time, propylene was introduced into the autoclave from a propylene gas-bomb to carry out the propylation of biphenyl in the autoclave.

Although the internal temperature of the autoclave raised slowly, the reaction temperature was maintained at about 280° C. by controlling the heating apparatus. When the reduction of the weight of the propylene gas-bomb became 3 kg, the supply of propylene was stopped and the reaction was continued further for one hour at the same temperature of 280° C., and then the autoclave was cooled.

After cooling the inner temperature to 40° C. and taking the reaction mixture out from the autoclave, the catalyst was removed by filtration and the filtrate was subjected to rectification treatment while carrying out the analysis by gas-chromatography to obtain the object, p-monoisopropylbiphenyl mixture. The thus obtained p-monoisopropylbiphenyl mixture showed the following composition and physical properties.

Composition:
- biphenyl: 0%
- o-monoisopropylbiphenyl: 0%
- m-monoisopropylbiphenyl: 6%
- p-monoisopropylbiphenyl: 93%
- diisopropylbiphenyl: 1%

Physical properties:
- Specific gravity at 15° C.: 0.982
- Refractive index at 25° C.: 1.5807
- Boiling point: 294° C.
- Temperature at which crystals precipitate: 5° C.

On subjecting the thus obtained p-monoisopropylbipheny mixture to a sensory-test concerning the "yes" or "no" of the odor of 30 ml of the specimen thereof taken into a 100 ml wide mouth bottle by 20 men and 20 women of the panel, the number of person who answered "yes" was 2.

The above-mentioned result shows that the thus obtaine p-monoisopropylbiphenyl mixture is excellent in odorlessness.

Synthesis of diisopropylnaphthalene mixture

Into a 20-liter autoclave provided with a heating apparatus, 9 kg of naphthalene and 1.5 kg of a silica-alumina catalyst (made by NIKKI Chemical Co., Ltd., X-632 HN) were introduced and oxygen in the autoclave was substituted by nitrogen gas. Then the autoclave was heated until the inner temperature raises to 100° C. and the stirring was commenced. At the same time, propylene was introduced from a propylene gas bomb to the autoclave to carry out propylation. Although the inner temperature slowly raised, the reaction temperature was maintained at about 220° C. by controlling the heating apparatus. When the reduction of the weight of the propylene gas-bomb became 6 kg, the supply of propylene was stopped, and after continuing the reaction further for one hour at the same temperature of 220° C., the autoclave was cooled.

After cooling the inner tempertture of the autoclave to 40° C. and taking the reaction mixture out therefrom, the catalyst was removed from the reaction mixture by filtration and the filtrate was subjected to rectification treatment while carrying out analysis by gas-chromatography to obtain the object, diisopropylnaphthalene mixture. The composition and the physical properties of the thus obtained diisopropylnaphthalene mixture were as follows.

Composition:
- Naphthalene: 0%
- Monoisopropylnaphthalene: 0.03%

Diisopropylnaphthalene: 98.60%
Triisopropylnaphthalene: 1.37%
Physical properties:
Specific gravity at 15° C.: 0.96
Refractive index at 25° C.: 1.568
Boiling temperature: 308° C.
Viscosity at 40° C.: 6.4 cst On subjecting the thus obtained diisopropylnaphthalene mixture to a sensory test concerning the "yes" or "no" of the odor of 30 ml of the specimen thereof taken into a 100 ml wide mouth bottle by 20 men and 20 women of the panel, the number of person who answered "yes" was only one.

The above-mentioned result shows that diisopropylnaphthalene mixture is excellent in odorlessness.

Preparation of the solvent of the chromogenic dye-precursor material for the pressure-sensitive recording paper sheet The present solvent was prepared by mixing 70 parts by weight of the thus obtained p-monoisopropylbiphenyl mixture and 30 parts by weight of diisopropylnaphthalene mixture. Into 100 ml of the thus prepared solvent, 30 g of Crystal Violet Lactone (made by by HoAYA Chemical Industry Co., Ltd.) (hereinafter referred to as CVL) were dissolved, and the concentration of CVL in the solution was determined in course of the time while keeping solution in a thermostat at 20° C. The results are shown in Table 1.

TABLE 1

| Time passed by (days) | 1 | 7 | 14 |
|---|---|---|---|
| Concentration of CVL (g/100 ml) | 16.0 | 9.4 | 8.6 |

As is clearly seen in Table 1, a state of high concentration was kept extremely stable for a long time.

In addition, no precipitate of crystals was observed in the solution of the chromogenic dye-precursor material at $-5°$ C.

EXAMPLE 2

Preparation of microcapsules

Microcapsules were prepared while using the present solvent prepared in Example 1 as follows.

A mixture of 630 g of melamine and 1620 g of an aqueous 37% solution of formaldehyde (hereinafter referred to as formalin) adjusted to pH of 9.0 by an aqueous 2% solution of sodium hydroxide was heated to 70° C. Just after the dissolution of melamine, 2250 g of water were added to the mixture, and the whole mixture was stirred for 3 min to obtain an aqueous solution of melamine-formaldehyde prepolymer.

Separately, a mixture of 600 g of urea and 1460 g of formalin adjusted to pH of 8.5 by triethanolamine was reacted at 70° C. for 1 hour to obtain an aqueous solution of urea-formaldehyde prepolymer.

Separately, into a stirred mixture of 1620 g of formalin and 600 g of urea, triethanolamine was added to adjust the pH of the mixture to 8.8, and the mixture was reacted at 70° C. for 30 min. Into 400 g of the thus obtained reaction mixture, 24 g of water and 30 g of tetraethylenepentamine were added and the pH of the thus prepared mixture was adjusted to 3 with an aqueous 15% solution of hydrochloric acid while stirring the mixture at 70° C. Since the pH of the mixture showed a reduction with the proceeding of the reaction, the pH of the mixture was readjusted to 3 by adding an aqueous 10% solution of sodium hydroxide, and then the reaction was continued at a reduced temperature of 55° C. When the viscosity of the reaction mixture became 200 cps, the reaction mixture was neutralized by adding the aqueous 10% solution of sodium hydroxide, and 4000 g of water were added to the thus neutralized reaction mixture to obtain an aqueous solution of water-soluble cationic urea resin.

After adjusting the pH of a mixture of 1000 g of the aqueous solution of melamine-formaldehyde prepolymer, 500 g of the aqueous solution of urea-formaldehyde prepolymer, 1580 g of the aqueous solution of water-soluble cationic urea resin, 620 g of water and 10 g of triethanolamine to 5.2 by the addition of an aqueous 10% solution of citric acid, 30 g of an aqueous 10% solution of a surfactant (made by KAO-Atlas Co., Ltd., NEOPELEX) was added to the mixture to obtain "A" liquid.

Separately, 500 g of Crystal Violet Lactone (a blue dye-precursor material made by HODOGAYA Chemical Industry Co., Ltd.) were dissolved in 9500 g of the mixed solvent prepared in Example 1 to obtain "B" liquid 1000 ml of "B" liquid were homogenized into "A" liquid in a homogenizer so that the diameter of the thus formed particles of emulsion became from 2 to 8 m. Thereafter, the thus formed emulsion was kept at 30° C. while gently stirring and the pH thereof was adjusted to 3.6 by the addition of an aqueous 1% solution of citric acid. After stirring the thus adjusted emulsion for 1 hour, 2000 ml of water were added thereto.

After leaving the mixture further for 3 hours, an aqueous 20% solution of citric acid was added thereto to adjust the pH thereof to 3.0 and the mixture was stirred for 20 hours to obtain a slurry of microcapsules.

Preparation of the pressure-sensitive recording paper sheet

Into 600 ml of an aqueous 10% solution of polyvinyl alcohol ( made by KURARE Co., Ltd., referred to as PVA), 300 g of the thus obtained microcapsules were added, and a dispersion of the microcapsules was prepared by stirring the mixture well.

The thus obtained aqueous dispersion was coated onto a paper sheet of 45 $g/m^2$ at a rate of 2.2 g of the microcapsules per $m^2$ of the paper sheet, and by superposing the thus treated paper sheet with a paper sheet on which a colour-developer comprising a condensate of p-phenylphenol and formaldehyde as the main colour-developer had been coating by a conventional method, a pressure-sensitive recording paper sheet was obtained.

After the colour-development of the thus obtained pressure-sensitive recording paper by a typewriter made by Olivetti Co. in the ordinary environment and keeping the thus colour-developed paper sheet in a dark place for 24 hours, the concentration of the thus developed colour was measured by a reflex colour-densitometer made by MACBETH Co.

On the other hand, another pressure-sensitive recording paper prepared by the same process as above was subjected to colour-development in the environment of $-5°$ C., and the concentration of the thus developed colour was measured by the same reflex colour-densitometer from the time just after colour-development, and the relative rate of colour-development was obtained in course of the time, in the case where the result of colour-development at ordinary temperature was appointed as 100, the results being shown in Table 2.

As will be seen in Table 2, the thus prepared pressure-sensitive recording paper showed a sufficiently initial colour-development of the thus obtained pressure-sensitive recording paper sheet after 30 sec of recording at a low temperature of −5° C.

TABLE 2

| Time | 30 sec | 1 min | 1 hour | 24 hours |
|---|---|---|---|---|
| Rate of colour-development (%) | 52 | 61 | 92 | 100 |

EXAMPLE 3

In the same manner as in Examples 1 and 2 except for using a solvent comprising 80 parts by weight of p-monoisopropylbiphenyl mixture and 20 parts by weight of diisopropylnaphthalene mixture, a solvent of the chromogenic dye-precursor material for the pressure-sensitive recording paper sheet and a pressure-sensitive recording paper sheet were prepared, and the solubility of the chromogenic dye-precursor material and initial colour-developing activity of the thus obtained pressure-sensitive recording paper sheet at low temperature were examined. As the result, the solubility of the chromogenic dye-precursor material after 14 days at 20° C. was 8.7 g/100 ml and the initial colour-development at −5° C. was 49%.

In addition, the thus prepared pressure-sensitive recording.paper sheet was odorless. No precipitation of crystals was observed at −5° C.

EXAMPLE 4

In the same manner as in Examples 1 and 2 except for using a solvent comprising 60 parts by weight of p-monoisopropylbiphenyl mixture and 40 parts by weight of diisopropylnaphthalene mixture, a solvent of the chromogenic dye-precursor material for the pressure-sensitive recording paper sheet and a pressure-sensitive recording paper sheet were prepared, and the solubility of the chromogenic dye-precursor material and the initial colour-developing activity of the thus obtained pressure-sensitive recording paper sheet at low temperature were examined. As the result, the solubility of the chromogenic dye-precursor after 14 days at 20° C. was 8.6 g/100 ml, and the initial colour-development at −5° C. was 47%.

In addition, the thus prepared pressure-sensitive recording paper sheet was odorless. No precipitation of crystals was observed at −5° C.

EXAMPLE 5

In the same manner as in Examples 1 and 2 except for using a solvent comprising 50 parts by weight of p-monoisopropylbiphenyl mixture and 50 parts by weight of diisopropylnaphthalene mixture, a solvent of the chromogenic dye-precursor material for the pressure-sensitive recording paper sheet and a pressure-sensitive recording paper sheet were prepared, and the solubility of the chromogenic dye-precursor material and the initial colour-developing activity of the thus obtained pressure-sensitive recording paper sheet at the low temperatures were examined. As the result, the solubility of the chromogenic dye-precursor material after 14 days at 20° C. was 8.5 g/100 ml and the initial colour-development at −5° C. was 44%.

In addition, the thus obtained pressure-sensitive recording paper sheet was odorless No precipitation of crystals was observed at −5° C.

EXAMPLE 6

In the same manner as in Examples 1 and 2 except for using a solvent comprising 40 parts by weight of p-monoisopropylbiphenyl mixture and 60 parts by weight of diisopropylnaphthalene mixture, a solvent of the chromogenic dye-precursor material and a pressure-sensitive recording paper sheet were prepared, and the solubility of the chromogenic dye-precursor material and the initial colour-developing activity of the thus obtained pressure-sensitive recording paper sheet at low temperature were examined. As the result, the solubility of the chromogenic dye-precursor material after 14 days at 20° C. was 8.4 g/100 ml and the initial colour-development at −5° C. was 43%.

In addition, the thus obtained pressure-sensitive recording paper sheet was odorless Precipitation of crystals was not observed at −5° C.

COMPARATIVE EXAMPLE 1

In the same manner as in Example 1 except for using 90 parts by weight of p-monoisopropylbiphenyl mixture and 10 parts by weight of diisopropylnaphthalene mixture, a solvent of the chromogenic dye-precursor material for the pressure-sensitive recording paper sheet was prepared, and the solubility of the chromogenic dye-precursor material was examined. As a result, the solubility of the chromogenic dye-precursor material after 14 days was 8.8 g/100 ml at 20° C. Namely, although the thus prepared solvent showed the same excellent solubility of the chromogenic dye-precursor material as the present solvent, crystals of p-monoisopropylbiphenyl precipitated from the solution of the chromogenic dye-precursor material at a low temperature of about 0° C.

COMPARATIVE EXAMPLE 2

In the same manner as in Examples 1 and 2 except for using a solvent comprising 20 parts by weight of p-monoisopropylbiphenyl mixture and 80 parts by weight of diisopropylnaphthalene mixture, a solvent of the chromogenic dye-precursor material for the pressure-sensitive recording paper sheet and a pressure-sensitive recording paper sheet were prepared, and the initial colour-developing activity of the thus prepared pressure-sensitive recording paper sheet at low temperature was examined. As a result, the initial colour-development at −5° C. was 32%.

COMPARATIVE EXAMPLE 3

In the same manner as in Examples 1 and 2 except for using only diisopropylnaphthalene mixture, a solvent of the chromogenic dye-precursor material for the pressure-sensitive recording paper sheet and a pressure-sensitive recording paper sheet were prepared, and the initial colour-developing activity of the thus obtained pressure-sensitive recording paper sheet at low temperatures was examined. As a result, the initial colour-development at −5° C. was 25%.

COMPARATIVE EXAMPLE 4

Regarding p-monoisopropylbiphenyl mixture used in Example 1, the solubility of the chromogenic dye-precursor material for the pressure-sensitive recording paper sheet was examined As a result, the solubility of the chromogenic dye-precursor material for the pressure-sensitive recording paper sheet after 14 days was 9.0 g/100 ml at 20° C. Namely, although p-monoisopropylbiphenyl showed an excellent solubility of the chromogenic dye-precursor material for the pressure-sensitive recording paper sheet to the same extent as in the present solvent, crystals precipitated from the solution of the chromogenic dye-precursor material for the pressure-sensitive recording paper sheet at 0° C. was observed.

COMPARATIVE EXAMPLE 5

In order to prevent the precipitation of crystals of p-monoisopropylbiphenyl from the solution of the chromogenic dye-precursor material, 1-xylyl-1-phenylethane was admixed with p-monoisopropylbiphenyl as follows.

A mixture of 30 parts by weight of 1-xylyl-1-phenylethane and 70 parts by weight of p-monoisopropylbiphenyl mixture of Example 1 were prepared, and the thus prepared solvent was sub]ected to a sensory test concerning odor by 40 persons of the panel As a result, all 40 persons answered that the solvent had an odor, and 23 persons complained an unpleasant odoriferousness.

As a result, a mixed solvent comprising 1-xylyl-1-phenylethane is not suitable as the solvent of the chromogenic dye-precursor material for the pressure-sensitive recording paper sheet.

COMPARATIVE EXAMPLE 6

A solvent of the chromogenic dye-precursor material for the pressure-sensitive recording paper sheet was produced as follows in the same process as in Example 1 of Japanese Patent Publication No. 50-14570 (1975).

Into an autoclave, 640 g of naphthalene and 35 g of aluminum chloride as a catalyst were introduced, and after introducing 420 g of propylene into the autoclave, the content of the autoclave was reacted at 95° C. for one hour. By subjecting the liquid reaction product to rectification treatment, 470 g of a fraction showing a boiling point of 300° to 310° C. were obtained. According to the nuclear magnetic resonance spectroscopy, mass spectrography, ultraviolet absorption spectrography, infrared absorption spectrography and gas-chromatography, it was confirmed that the thus obtained fraction contained 95% by weight of diisopropylnaphthalene.

Into an autoclave, 616 g of biphenyl and 35 g of aluminum chloride as a catalyst were introduced, and after introducing 168 g of propylene into the autoclave, the content of the autoclave was reacted at 95° C. for one hour, and the thus obtained liquid reaction mixture was subjected to rectification treatment, thereby obtaining 280 g of a fraction showing a boiling point of 290° to 300° C. As a result of gas-chromatographic analysis, the composition of the thus obtained fraction was as follows.

o-monoisopropylbiphenyl: 0%
m-monoisopropylbiphenyl: 62%
p-monoisopropylbiphenyl: 36% and
diisopropylbiphenyl: 2%

The physical properties of the above-mentioned fraction was as follows.

Specific gravity at 15° C.: 0.987
Refractive index at 25° C.: 1.580

A mixture of 30 parts by weight of the thus obtained fraction of monoisopropylbiphenyl mixture and 70 parts by weight of the thus obtained fraction of diisopropylnaphthalene mixture was subjected to the sensory test concerning odor.

As a result of the sensory test, all 40 persons of the panel of 20 men and 20 women answered that the thus prepared mixture had an odor, and 24 persons complained an unpleasant odoriferousness.

COMPARATIVE EXAMPLE 7

A solvent prepared by mixing 40 parts by weight of the same fraction of monoisopropylbiphenyl mixture produced in Comparative Example 6 and 60 parts by weight of diisopropylnaphthalene mixture used in Example 1 was subjected to the sensory test concerning odors.

As a result, all 40 persons of the panel answered "yes" and 19 persons complained an unpleasant odoriferousness.

COMPARATIVE EXAMPLE 8

In the same procedures as described in Example 2 of Japanese Patent Publication No. 50-14570 (1975), a mixture of diisopropylnaphthalene and monoisopropylbiphenyl was produced as follows.

Into an autoclave, 910 g of naphthalene, 1090 g of diphenyl and 200 g of silica-alumina (containing 13% by weight of alumina) as a solid acid catalyst were introduced, and after introducing 1190 g of propylene into the autoclave, the content of the autoclave was reacted at 200° C. for one hour, and the liquid reaction mixture was subjected to rectification treatment, thereby obtaining 1250 g of a fraction showing a boiling point of 280° to 320° C.

As a result of gas-chromatographic analysis, the composition of the thus obtained fraction was as follows.

Monoisopropylnaphthalene: 8%
o-Monoisopropylbiphenyl: 2%
m-Monoisopropylbiphenyl: 11%
p-Monoisopropylbiphenyl: 22%
Diisopropylnaphthalene: 45%
Diisopropylbiphenyl: 12%

The specific gravity at 15° C. and the refractive index at 25° C. of the above-mentioned fraction were 0.972 and 1.572, respectively.

The results of a sensory test concerning odors by 40 persons of the panel of 20 men and 20 women were all 40 persons answered "yes" and 38 persons complained an unpleasant odoriferousness.

EXAMPLE 7

Synthesis of p-monoisopropylbiphenyl mixture

Into a 2-liter stainless steel autoclave provided with a heating apparatus, 0.8 kg of biphenyl and 0.1 kg of zeolite Y-type catalyst (made by TOYO SODA Co., Ltd., TSZ-330 HUA, Dry: 300° C. for 3 hrs) were introduced, and oxygen in the autoclave was substituted by nitrogen gas. Then the autoclave was heated to 70° C. (inner temperature), and the stirring was commenced. From the same time, propylene was introduced into the autoclave from a propylene gas-bomb to carry out the propylation of biphenyl in the autoclave.

Although the internal temperature of the autoclave raised slowly, the reaction temperature was maintained at about 270° C. by controlling the heating apparatus. When the reduction of the weight of the propylene gas-bomb became 0.2 kg, the supply of propylene was stopped and the reaction was continued further for one hour at the same temperature of 270° C., and then the autoclave was cooled.

After cooling the inner temperature to 40° C. and taking the reaction mixture out from the autoclave, the catalyst was removed by filtration and the filtrate was subjected to rectification treatment while carrying out the analysis by gas-chromatography to obtain the object, p-monoisopropylbiphenyl mixture. The thus obtained p-monoisopropylbiphenyl mixture showed the following composition and physical properties.

Composition:
- biphenyl: 0%
- o-monoisopropylbiphenyl: 0%
- m-monoisopropylbiphenyl: 2%
- p-monoisopropylbiphenyl: 91%
- diisopropylbiphenyl: 7%

Physical properties:
- Specific gravity at 15° C.: 0.988
- Refractive index at 25° C.: 1.582
- Boiling point 292° C.:
- Temperature at which crystals precipitate: 9° C.

On subjecting the thus obtained p-monoisopropylbiphenyl mixture to a sensory-test concerning the "yes" or "no" of the odor of 30 ml of the specimen thereof taken into a 100 ml wide mouth bottle by 20 men and 20 women of the panel, the number of person who answered "yes" was 3.

The above-mentioned result shows that the thus obtained p-monoisopropylbiphenyl mixture is excellent in odorlessness.

Preparation of the pressure-sensitive recording paper sheet

In the same manner as in Examples 1 and 2 except for using the thus obtained p-monoisopropylbiphenyl mixture, a solvent of the chromogenic dye-precursor material for pressure-sensitive recording paper sheet and a pressure-sensitive recording paper sheet were prepared, and the solubility of the chromogenic dye-precursor material and initial colour developing activity of the thus obtained pressure-sensitive recording paper sheet at low temperature were examined. As the result, the solubility of the chromogenic dye-precursor material after 14 days at 20° C. was 8.3 g/100 ml and the initial colour-development at −5° C. was 51%. Further, the thus prepared pressure-sensitive recording paper sheet was odorless and no precipitation of crystals was observed at −5° C.

EXAMPLE 8

Synthesis of p-monoisopropylbiphenyl mixture

Into a 1-liter glass autoclave provided with a heating apparatus, 0.5 kg of biphenyl and 0.014 kg of aluminium chloride catalyst were introduced, and oxygen in the autoclave was substituted by nitrogen gas. Then the autoclave was heated to 70° C. (inner temperature), and the stirring was commenced. From the same time, propylene was introduced into the autoclave from a propylene gas-bomb to carry out the propylation of biphenyl in the autoclave.

Although the internal temperature of the autoclave raised slowly, the reaction temperature was maintained at about 90° C. by controlling the heating apparatus. Propylene was supplied into the autoclave for 6 hours and when the reduction of the weight of the propylene gas-bomb became 0.165 kg, the supply of propylene was stopped, and then the autoclave was cooled.

After cooling the inner temperature to 40° C. and taking the reaction mixture out from the autoclave, the catalyst was removed and the thus obtained organic layer was subjected to rectification treatment while carrying out the analysis by gas-chromatography to obtain the object, p-monoisopropylbiphenyl mixture. The thus obtained p-monoisopropylbiphenyl mixture showed the following composition and physical properties.

Composition:
- biphenyl: 0%
- o-monoisopropylbiphenyl: 0%
- m-monoisopropylbiphenyl: 4%
- p-monoisopropylbiphenyl: 95%
- diisopropylbiphenyl: 1%

Physical properties:
- Specific gravity at 15° C.: 0.986
- Refractive index at 25° C.: 1.585
- Boiling point: 292° C.
- Temperature at which crystals 4° C. precipitate:

On subjecting the thus obtained p-monoisopropylbiphenyl mixture to a sensory-test concerning the "yes" or "no" of the odor of 30 ml of the specimen thereof taken into a 100 ml wide mouth bottle by 20 men and 20 women of the panel, the number of person who answered "yes" was 8.

The above-mentioned result shows that the thus obtained p-monoisopropylbiphenyl mixture is excellent in odorlessness.

Preparation of the pressure-sensitive recording paper sheet

In the same manner as in Examples 1 and 2 except for using the thus obtained p-monoisopropylbiphenyl mixture, a solvent of the chromogenic dye-precursor material for the pressure-sensitive recording paper sheet and a pressure-sensitive recording paper sheet were prepared, and the solubility of the chromogenic dye-precursor material and initial colour-developing activity of the thus obtained pressure-sensitive recording paper sheet at low temperature were examined. As the result, the solubility of the chromogenic dye-precursor material after 14 days at 20° C. was 8.2 g/100 ml and the initial colour-development at −5° C. was 51%. Further, the thus prepared pressure-sensitive recording paper sheet was odorless and no precipitation of crystals was observed at −5° C.

REFERENCE EXAMPLE 1

Synthesis of m-monoisopropylbiphenyl

Into a 20-liter stainless-steel autoclave provided with a heating apparatus, 12 kg of biphenyl and 1.5 kg of a silica-alumina catalyst (made by NIKKI Chemical Co., Ltd., X-632 HN) were introduced, and after substituting oxygen in the autoclave by nitrogen gas, the content of the autoclave was heated.

When the inner temperature of the autoclave raised to 70° C., the stirring was commenced and at the same time, gaseous propylene was introduced into the autoclave to carry out the propylation.

Although the inner temperature of the autoclave raised slowly, the reaction temperature was maintained at about 260° C. by controlling the heating apparatus.

When the reduction of the weight of the bomb became 3 kg, the supply of propylene was stopped, and after continuing the reaction for one hour at the same temperature of 260° C. the autoclave was cooled.

After cooling the autoclave to 40° C., the liquid reaction mixture was taken out from the autoclave and the catalyst was removed from the reaction mixture by filtration. The filtrate was subjected to rectification treatment while analyzing the distillate by gas-chromatography to obtain m-monoisopropylbiphenyl of a purity of 93%.

As a result of subjecting 100 ml of the thus obtained m-monoisopropylbiphenyl taken in a 300 ml-wide mouth bottle to a sensory test concerning odors, 36 persons of all 40 persons of the panel answered "yes", and 13 persons of 36 persons complained an unpleasant odoriferousness.

REFERENCE EXAMPLE 2

Synthesis of o-monoisopropylbiphenyl

Into a 20-liter stainless-steel autoclave provided with a heating apparatus, 12 kg of biphenyl and 1.5 kg of silica-alumina catalyst (made by NIKKI Chemical Co., Ltd., X-632 HN) were introduced, and after substituting oxygen in the autoclave by nitrogen gas, the content of the autoclave was heated.

When the inner temperature of the autoclave raised to 70° C., the stirring was commenced and at the same time, gaseous propylene was introduced into the autoclave to carry out the propylation.

Although the inner temperature of the autoclave raised slowly, the reaction temperature was maintained at about 190° C. by controlling the heating apparatus.

When the reduction of the weight of the bomb became 3 kg, the supply of propylene was stopped, and after continuing the reaction for one hour at the same temperature of 190° C., the autoclave was cooled.

After cooling the autoclave to 40° C., the liquid reaction mixture was taken out from the autoclave and the catalyst was removed from the reaction mixture by filtration. The filtrate was subjected to rectification treatment while analyzing the distillate by gas-chromatography to obtain o-monoisopropylbiphenyl of a purity of 83%.

As a result of subjecting 100 ml of the thus obtained m-monoisopropylbiphenyl taken in a 300 ml-wide mouth bottle to a sensory test concerning odors, all 40 persons of the panel answered ∓yes" and 26 persons complained an unpleasant odoriferousness.

What is claimed is:

1. Microcapsules for a pressure-sensitive recording paper sheet, comprising hydrophilic colloid walls containing a dye composition which is composed of a chromogenic dye-precursor material and a substantially odorless solvent for a chromogenic dye-precursor material for a pressure-sensitive recording paper sheet, consisting essentially of (1) 30 to 80% by weight of p-monoisopropylbiphenyl or a biphenyl mixture of not less than 80% by weight of p-monoisopropylbiphenyl, not more than 20% by weight of m-monoisopropylbiphenyl and not more than 10% by weight of diisopropylbiphenyl, the biphenyl mixture being substantially completely devoid of o-monoisopropylbiphenyl, and (2) 70 to 20% by weight of diisopropylnaphthalene or a naphthalene mixture of not less than 97% by weight of diisopropylnaphthalene, not more than 1% by weight of monoisopropylnaphthalene and not more than by weight of triisopropylnaphthalene.

2. A pressure-sensitive recording paper sheet coated with microcapsules containing a dye composition which is composed of a chromogenic dye-precursor material and a substantially odorless solvent for a chromogenic dye-precursor material for a pressure-sensitive recording paper sheet, consisting essentially of (1) 30 to 80% by weight of p-monoisopropylbiphenyl or a biphenyl mixture of not less than 80% by weight of p-monoisopropylbiphenyl, not more than 20% by weight of m-monoisopropylbiphenyl and not more than 10% by weight of diisopropylbiphenyl, the biphenyl mixture being substantially completely devoid of o-monoiaopeopylviphwnyl, and (2) 70 and 20% by weight of diisopropylnaphthalene or a naphthalene mixture of not less than 97% by weight of diisopropylnaphthalene, not more than 1% by weight of monoisopropylnaphthalene and not more than 2% by weight of triisopropylnaphthalene.

* * * * *

UNITED STATES PATENT AND TRADEMARK OFFICE

CERTIFICATE OF CORRECTION

PATENT NO. : 4,774,136

DATED : September 27, 1988

INVENTOR(S) : OKADA et al

It is certified that error appears in the above-identified patent and that said Letters Patent is hereby corrected as shown below:

Front Page under heading [30] Foreign Application Priority Data:

The correct Japanese Patent application number should read:

--61-102277--

Signed and Sealed this

Eighteenth Day of April, 1989

*Attest:*

DONALD J. QUIGG

*Attesting Officer*

*Commissioner of Patents and Trademarks*